(No Model.)
J. HILLIARD.
DISTRIBUTER FOR FERTILIZERS.
No. 349,717. Patented Sept. 28, 1886.
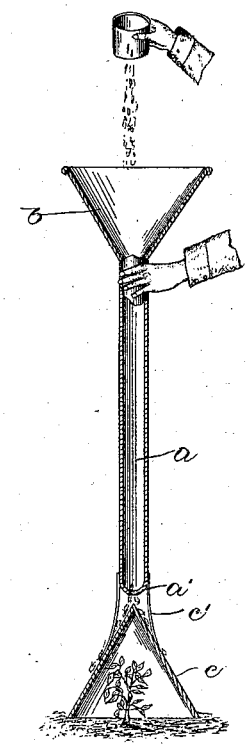

UNITED STATES PATENT OFFICE.

JOSEPH HILLIARD, OF NORTHBOROUGH, MASSACHUSETTS.

DISTRIBUTER FOR FERTILIZERS.

SPECIFICATION forming part of Letters Patent No. 349,717, dated September 28, 1886.

Application filed July 2, 1886. Serial No. 206,952. (No model.)

*To all whom it may concern:*

Be it known that I, JOSEPH HILLIARD, of Northborough, county of Worcester, and State of Massachusetts, have invented an Improvement in Distributers for Fertilizers, of which the following description, in connection with the accompanying drawing, is a specification.

In supplying the soil in proximity to plants with fertilizer it is now customary to sprinkle the same carefully around the plant in order that the particles thereof may not come in contact with the leaves to thereby destroy the plant. With large plots of land this method of distributing fertilizer is very tiresome and consumes much time.

This invention has for its object to construct a device for distributing fertilizer or other material around plants, it being so arranged that while the fertilizer is falling upon the soil the plant is concealed.

In accordance with this invention a tube of suitable length, and having a flaring or conical inlet, is employed, through which the material passes, the lower end of the said tube gradually diminishing in diameter to present a small delivery-opening. A hollow conical distributer is placed beneath and attached to said tube by suitable connecting rods or arms, the apex of the said conical distributer lying near to the lower end of the tube and in a direct line with the central axis thereof, so that the fertilizer or other material passing downward through the tube falls upon the conical distributer, and is thereby distributed in all directions, the plant at such time being concealed within the said hollow conical distributer.

The entire apparatus, being light and portable, is moved from plant to plant, and the fertilizer or other material is thrown into the tube.

The figure shows in vertical section a device for distributing fertilizer embodying this invention.

The tube $a$, through which the material passes, is provided with a flaring or conical inlet, $b$, of any suitable size, and the lower end of the tube $a$ is reduced in diameter to present a conical or tapering delivery through which the material passes. A hollow conical distributer, $c$, is located beneath the lower end of the tube $a$, and connected with the said tube by suitable connecting rods or arms $c'$. The apex of the conical distributer $c$ lies in a direct line with the central axis of the tube, so that the material passing downward through the tapering delivery end of the tube, and striking the apex of the said conical distributer, is thereby distributed nearly equally upon all sides thereof.

The distributer is made of sufficient size to be placed over and thereby shield a plant, and as the entire apparatus is moved from plant to plant the distributer conceals the plant, while the fertilizer falls upon the soil in a ring about it, to be turned into the soil as the plants are cultivated.

By the device herein described the soil about a large number of plants may be supplied with fertilizer in a very short space of time with ease, and as the device may be made of sheet-tin it will cost but a small amount.

It is obvious, instead of connecting the distributer rigidly with the tube, as herein shown, that it may be detachably connected, so that other distributers of different size may be supplied, according to the size of the plants to be cultivated.

The farmer may, for instance, carry a pail of fertilizer with him as he goes from plant to plant, and by means of a suitable cup pour the material into the tube $a$; but it is obvious that a reservoir may be provided, and a definite quantity of material be allowed to enter the tube $a$ by the operation of suitable valves.

I am aware that devices have heretofore been used for distributing fertilizers around plants, such devices being so constructed as to be adapted to protect the plants from the fertilizers distributed, and I do not therefore wish to be understood as claiming conical or other similar distributers, broadly.

I claim—

1. As an improved article of manufacture, an apparatus for distributing fertilizer and other material, consisting of a tube having at its delivery end a hollow conical distributer connected with but separated from said tube, the base of the said conical distributer being of greater diameter than the said tube, and the apex thereof being in a line with the central axis of the tube, substantially as set forth.

2. The tube having the conical inlet of funnel b, and the tapering end a', provided with a delivery-aperture, combined with the hollow conical distributer c, connected with but separated from the said tube and having its apex in line with the said aperture, substantially as set forth.

In testimony whereof I have signed my name to this specification in the presence of two subscribing witnesses.

JOSEPH HILLIARD.

Witnesses:
E. W. WOOD,
S. CLARK.